(12) United States Patent
Yamazaki (10) Patent No.: US 7,648,358 B1
(45) Date of Patent: Jan. 19, 2010

(54) PLASTIC PELLET FORMING APPARATUS

(75) Inventor: Yoshihiko Yamazaki, Chikuma (JP)

(73) Assignee: Holon Seiko Co., Ltd., Nagano (JP)

( * ) Notice: Subject to any disclaimer, the term of this patent is extended or adjusted under 35 U.S.C. 154(b) by 0 days.

(21) Appl. No.: 12/247,811

(22) Filed: Oct. 8, 2008

(51) Int. Cl.
*B29C 47/88* (2006.01)

(52) U.S. Cl. .................. 425/379.1; 426/6; 426/294; 426/311; 426/378.1

(58) Field of Classification Search .............. 425/6, 425/294, 309, 311, 376.1, 378.1, 378.2, 379.1, 425/382.3, 464
See application file for complete search history.

(56) References Cited

U.S. PATENT DOCUMENTS

| | | | | |
|---|---|---|---|---|
| 3,323,170 | A | * | 6/1967 | Swickard, Jr. et al. ....... 425/310 |
| 3,981,959 | A | * | 9/1976 | Cuff ........................ 264/142 |
| 4,327,050 | A | * | 4/1982 | Salmon ..................... 264/142 |
| 4,378,964 | A | * | 4/1983 | Wolfe, Jr. .................. 425/463 |
| 4,720,251 | A | * | 1/1988 | Mallay et al. ................ 425/67 |
| 4,804,319 | A | * | 2/1989 | Langner ..................... 425/79 |
| 5,268,132 | A | * | 12/1993 | Keilert et al. ............... 264/169 |
| 6,149,847 | A | * | 11/2000 | Geier et al. ................. 264/103 |
| 6,572,798 | B2 | * | 6/2003 | Nitschke et al. ............ 264/40.3 |
| 6,610,146 | B1 | * | 8/2003 | Peng et al. .................. 118/125 |
| 6,638,045 | B2 | * | 10/2003 | Yoshii et al. .................. 425/67 |
| 6,737,009 | B2 | * | 5/2004 | Taylor et al. ................ 264/555 |
| 2002/0006451 | A1 | * | 1/2002 | Swoboda et al. ............. 425/67 |

FOREIGN PATENT DOCUMENTS

| | | |
|---|---|---|
| JP | 09-029739 | 2/1997 |
| JP | 09-193158 | 7/1997 |
| JP | 2001-088196 | 4/2001 |
| JP | 2002-059419 | 2/2002 |

* cited by examiner

*Primary Examiner*—Yogendra Gupta
*Assistant Examiner*—Emmanuel S Luk

(57) ABSTRACT

A molten plastic extruded from extruding means 10 is formed into a strand 50 by a die 40, passed through an inner side of a cylindrical guide 60 erected vertically, thereafter, the strand 50 is successively cut uniformly to a constant length by a cutter 90 to form a pellet. A refrigerant for air cooling is circulated at a surrounding of the strand 50 passing through the inner side of the cylindrical guide 60 by cooling means 100 of the strand without being leaked to outside air.

13 Claims, 3 Drawing Sheets

PLASTIC PELLET FORMING APPARATUS

TECHNICAL FIELD

The present invention relates to a plastic pellet forming apparatus used at a plastic injection molding site for crushing, granulating, and melting a plastic scrap of a runner, a failed mold product or the like discharged from a molding machine, thereafter, the scrap is formed into a pellet and recycled to a plastic product at the molding site.

BACKGROUND ARTS

A plastic scrap of a runner, a failed mold product or the like discharged from a molding machine is crushed, mixed with a virgin material and is recycled to a mold material of a plastic product.

In a field of plastic molding referred to as so-to-speak fine stable molding, by simply crushing a plastic scrap as described above, a crush material thereof is mixed with small powders or large or small nonuniform crush particles, and when the crush material is used for plastic molding as it is, there is a concern of hampering the fine stable molding of a plastic.

Therefore, when the fine stable molding of a plastic is carried out, there is needed a pellet forming apparatus pelletizing the temporarily crushed crush material to a constant size.

According to a pellet forming apparatus of pelletizing the crush material, generally, a melted plastic is passed through a die from extruding means of a hot rotation screw type to constitute a strand and is continuously extruded. The strand extruded by passing the die is successively cut uniformly to a constant length by a cutter to form into a pellet.

Meanwhile, the strand extruded from the die and brought into an uncooled molten state is provided with an adhering force, and when the strand is cut into a plurality of pellets by the cutter as it is, the plurality of pellets become large particles by sticking together or the like.

Therefore, a normal pellet forming apparatus is provided with a water tank stored with cooling water for cooling and solidifying the strand extruded from the die and brought into the molten state. Further, the strand extruded from the die is cooled to solidify by passing the strand through the water tank. Thereafter, the strand is successively and evenly cut to a constant length to form into a pellet by a cutter by reeling the cooled and solidified strand by a pinch roller or the like.

The generally-used pellet forming apparatus is provided with a large-sized extruding means of the hot rotation screw type, the large-sized water tank of the water cooling type for cooling the strand and the like, occupies a wide installing area and is expensive.

Therefore, the apparatus is unsuitable for being used at a plastic injection molding site having a narrow installing area.

Further, according to the normally-used water cooling type pellet forming apparatus, when a plastic scrap to be pelletized is switched to that of a different kind or a different color, there is needed a troublesome and laborious setting operation or the like of passing again the newly switched strand formed to be cooled of a different kind or a different color through the water tank stored with cooling water, and enormous time and labor are required for the switching. Further, also when a middle portion of the strand is temporarily interrupted to cut by some cause, there is needed the troublesome and laborious setting operation of passing again the strand through the water tank stored with cooling water.

Further, the normally-used pellet forming apparatus is of the water cooling type for passing the strand through the water tank stored with the cooling water to cool and solidify, and therefore, after cutting the cooled and solidified strand into a pellet, a post step of drying the pellet is needed, and the equipment is large-sized and also expensive by that amount.

Owing to the reason, the normally-used water cooling type pellet forming apparatus is unsuitable for being installed at a plastic molding site to be used.

As pellet forming apparatus for resolving the difficulties, there are apparatus described in JP-A-9-29739, JP-A-2001-88196, and JP-A-2002-59419 of an air cooling type of cooling and solidifying a strand extruded from a die and brought into a molten state by the atmosphere by excluding a large-sized water tank of cooling and solidifying a strand.

Among them, the apparatus described in JP-A-9-29739 is constituted by a structure of introducing to cool a strand extruded by passing a die from a hot rotation screw and brought into a molten state to an inner side of a bush/mechanical element of an air cooling type by being guided at inside of a groove for guiding.

Therefore, according to the apparatus, as described in paragraph 0002 of JP-A-9-193158, the strand brought into the uncooled molten state is guided in the guiding groove while staying in an uncooled soft state immediately after having been extruded from the die, in that occasion, a diameter of the strand guided at inside of the guiding groove does not become uniform but unstable.

Further, according to the apparatus, there is frequently brought about a situation in which a cooling efficiency in cooling the strand by blowing air to a surrounding of the strand brought into the molten state passing through the inner side of the bush/mechanical element is poor, and the strand is discharged to outside of the bush/mechanical element without being sufficiently cooled and solidified.

A cause thereof resides in that a large amount of air for cooling blown to the inner side of the bush/mechanical element is not circulated at a surrounding of the strand passing through the inner side of the bush/mechanical element but is leaked to outside of the bush/mechanical element from widely opened upper end opening portion or lower end opening portion of the bush/mechanical element. Further, the strand is cooled by using air in a normal temperature state, and therefore, when the atmospheric temperature is high, there is brought about a situation in which the strand is not sufficiently cooled and solidified.

Further, according to the apparatus, when the strand is going to be formed from a state of a low die temperature, a front end of the strand in an uncooled and soft state extruded from a strand forming path of the die and is bent in a ring-like shape. Further, the front end of the strand bent in the ring-like state closes the upper end opening portion of the bush/mechanical element without being smoothly introduced to the inner side of the bush/mechanical element by being passed through the groove for guiding. Further, the pellet forming apparatus cannot continuously be operated.

The apparatus described in JP-A-2001-88196 is constituted by a structure of cooling and solidifying a strand by blowing air from a blower to the strand extruded from the die and brought into the molten state. A metal net is expanded on a side opposed to the blower by interposing a path of the strand therebetween. Further, there is constituted a structure in which the strand is prevented from being bent considerably by receiving a wind pressure of air blown from the blower by the metal net.

According to the apparatus, a large amount of air for cooling blown from the blower is firmly brought into contact with the strand which is uncooled and brought into a soft state, is not circulated at a surrounding of the strand but is wastefully passed to a side of the metal net of a portion remote from the strand. Therefore, there is a difficulty that the strand is not efficiently and sufficiently cooled and solidified.

Therefore, according to the apparatus, the path for blowing air for cooling from the and blower passing the strand brought into the uncooled soft state is set to be long and the strand is continued to be cooled by a long distance and for a long time period. Therefore, the strand brought into the soft state is brought into a state of being prolongedly hung to a downward side of the die, and the strand disposed at a vicinity of the die is brought into a state of being elongated to be long by receiving a self weight of the strand which is prolongedly hung. Further, there is a difficulty of considerably varying an outer diameter of the strand extruded from the die.

Further, according to the apparatus, there is brought about a situation in which owing to a style of cooling the strand brought into the molten state by air in a normal temperature state, the strand is not sufficiently cooled and solidified by being influenced by a variation in the atmospheric temperature.

The apparatus of JP-A-2002-59419 is provided with a guide roller at a midway of a path of the strand to prolong a time period of cooling the strand brought into the molten state. Further, the strand extruded from the die and brought into the uncooled soft state is circulated to pass a surrounding of the guide roller substantially in a V-like shape by a long distance. Further, there is constituted a structure of sufficiently cooling and solidifying the strand by air by taking time.

According to the apparatus, in starting to operate the apparatus, there is needed a troublesome and laborious setting operation of making a strand extruded from the die and brought into the molten state wrap on the surrounding of the guide roller or the like. Further, the apparatus is large-sized by an amount of adding the guide roller and is unsuitable for an apparatus of being used by being placed at a plastic molding site an installing area of which is intended to be narrowed.

SUMMARY OF THE INVENTION

The invention is a pellet forming apparatus capable of resolving the problem, installed at a plastic molding site an installing area of which is intended to be narrowed for pelletizing a crushed plastic scrap successively to a constant size, and is a plastic pellet forming apparatus of an air cooling type capable of cooling and solidifying a strand extruded from a die and brought into an uncooled molten state efficiently, firmly and sufficiently.

A plastic pellet forming apparatus of the invention is provided with extruding means of a molten plastic for melting and extruding a plastic material for forming a pellet, a die for introducing the molten plastic extruded from the extruding means to a strand forming path, forming a strand, and extruding the strand from a lower end of the strand forming path in a vertical lower direction. A cylindrical guide which is a cylindrical guide constituting cooling means of the strand vertically erected right below the lower end of the strand forming path of the die for introducing the strand extruded from the die from an upper end opening portion, passing the strand at an inner side thereof, thereafter, discharging the strand from a lower end opening portion is provided. Further, a cutter for cutting the strand of cutting the strand discharged from the lower end opening portion of the cylindrical guide successively uniformly to a constant length is provided.

The cooling means of the strand is constituted by a structure of feeding a refrigerant for air cooling from the upper end opening portion of the cylindrical guide to an inner side of the cylindrical guide without escaping the refrigerant to outside air, circulating the refrigerant at a surrounding of the strand passing the inner side of the cylindrical guide without leaking the refrigerant to the outside of the cylindrical guide, thereafter, discharging the refrigerant from the lower end opening portion of the cylindrical guide to outside of the cylindrical guide.

According to the plastic pellet forming apparatus, by the cooling means of the strand, all of the refrigerant for air cooling can be fed from the upper end opening portion of the cylindrical guide to the inner side of the cylindrical guide efficiently and firmly without escaping the refrigerant to the outside air. Further, substantially all of the refrigerant for air cooling fed to the inner side of the cylindrical guide can be brought into contact with the strand passing the inner side of the cylindrical guide which is not provided with an opening portion of a hole or the like at a side wall thereof without leaking the refrigerant to outside of the cylindrical guide. Further, the refrigerant for air cooling fed to the inner side of the cylindrical guide can be circulated to the surrounding of the strand passing the inner side of the cylindrical guide efficiently and firmly. Further, by the refrigerant circulated at the surrounding of the strand, the strand passing the inner side of the cylindrical guide can be cooled and solidified efficiently and firmly.

According to the plastic pellet forming apparatus of the invention, it is preferable that the die branches the molten plastic extruded from the extruding means to introduce into a plurality of the strand forming paths and respectively extrudes the strands in the vertical lower direction from the lower ends of the plurality of strand forming paths.

Further, it is preferable that the cylindrical guide is constituted by a plurality of the cylindrical guides respectively erected vertically right below the lower ends of the plurality of strand forming paths which are the plurality of cylindrical guides for introducing the strand extruded from the lower ends of the strand forming paths in the vertical lower direction from the upper end opening portions, passing the strands to the inner sides of the cylindrical guides and discharging the strands from the lower end opening portions to outsides of the cylindrical guides.

According to the plastic pellet forming apparatus, the molten plastic extruded from the extruding means can be branched to introduce to a plurality of not one but two or more of the strand forming paths provided at the die. Further, the strands can simultaneously be extruded in the vertical lower direction respectively from lower ends of the plurality of two or more of strand forming paths. Further, a plurality of pieces of strands for forming a pellet can simultaneously be formed in a short period of time.

Further, the plurality of pieces of strands simultaneously formed in the short period of time in this way can respectively introduced from upper end opening portions respectively to inner sides of the plurality of cylindrical guides respectively erected vertically right below lower ends of the plurality of strand forming paths of the die. Further, the plurality of pieces of strands can simultaneously be cooled and solidified by circulating the refrigerant for air cooling at the surroundings of strands respectively passed through the inner sides of the plurality of cylindrical guides by the cooling means. The solidified strands can be formed into pellets by being cut successively and uniformly to a constant length by a cutter for cutting the strand. Further, a number of the pellets can simultaneously be formed in the short period of time.

Further, by forming the molten plastic extruded from the extruding means to branch to the plurality of pieces of strands by the die, and passing the plurality of pieces of strands to the inner sides of the plurality of cylindrical guides respectively separately, an efficiency of cooling the strands brought into the molten state passing respectively inner sides of the plurality of cylindrical guides by the air cooling type cooling means can be promoted. Further, the plurality of pieces of cooled and solidified strands for forming pellets can be formed efficiently and simultaneously within a short period of time.

According to the plastic pellet forming apparatus of the invention, the refrigerant for air cooling may be cooling air or may be air at a normal temperature.

When the refrigerant for air cooling is constituted by cooling air, in comparison with air at a normal temperature, a cooling efficiency in cooling the strand passing through the inner side of the cylindrical guide by the cooling means can firmly be promoted. Further, when the refrigerant for air cooling is cooling air, the strand passing through the inner side of the cylindrical guide can stably and firmly be cooled and solidified by the cooling means without being influenced by a change in the atmospheric temperature.

According to the plastic pellet forming apparatus of the invention, it is preferable to constitute a structure in which the lower end of the strand forming path of the die is provided with a throat nozzle for forming the strand a front end inner diameter of which is smaller than an inner diameter of the cylindrical guide to be communicated with the strand forming path, and a front end of the throat nozzle is introduced to an inner side of an upper end opening portion of the cylindrical guide in a state of being hung at a middle thereof in noncontact with an inner wall of the cylindrical guide.

According to the plastic pellet forming apparatus, the outer diameter of the strand can be narrowed to the small diameter up to the inner diameter of the front end of the throat nozzle smaller than the inner diameter of the cylindrical guide by passing the strand extruded from the die and brought into the molten state to the inner side of the throat nozzle for forming the strand provided at the lower end of the strand forming path of the die to be communicated with the strand forming path. Successively, the strand narrowed to the small diameter can smoothly be introduced without a catching resistance from the upper end opening portion to the inner side of the cylindrical guide the inner diameter of which is larger than the small diameter.

At that occasion, the front end of the throat nozzle is introduced to the inner side of the upper end opening portion of the cylindrical guide in the state of being hung at the middle in noncontact with the inner wall of the cylindrical guide, and therefore, the strand extruded from the front end of the throat nozzle, having the adhering force and brought into the molten state can smoothly be introduced to substantially the center of the inner side of the cylindrical guide without the catching resistance without being adhered to the inner wall of the cylindrical guide.

As has been explained above, according to the plastic pellet forming apparatus of the invention, the strand extruded from the die and brought into the molten state can be cooled and solidified efficiently, sufficiently and firmly in the short period of time. Further, the molten plastic extruded from the extruding means can be formed into a number of pellets efficiently within the short period of time.

Further, owing to the air cooling type, the large-scaled water tank of the water cooling type for cooling the strand, the troublesome and laborious setting operation of the strand are dispensed with and the plastic pellet forming apparatus preferable for being used handily by being placed at a plastic forming site having a narrow installing area can be provided.

DESCRIPTION OF THE PREFERRED EMBODIMENTS

Hereinafter, description will be made as regard to preferred embodiments of the present invention with reference to drawings.

Figure 1:
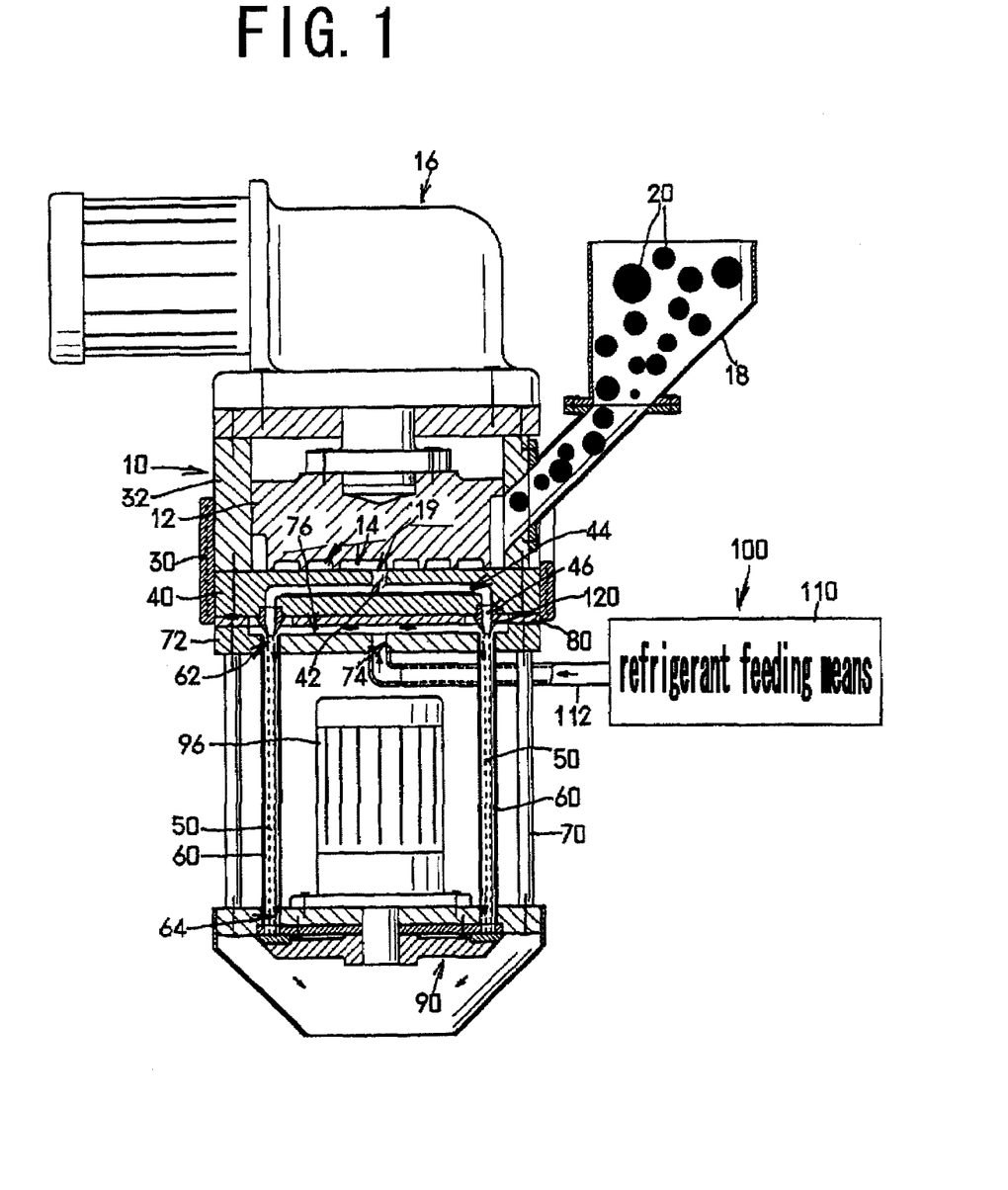
FIG. 1 is a front sectional view of a plastic pellet forming apparatus of the invention.

As shown by FIG. 1, the plastic pellet forming apparatus is provided with extruding means 10 of a molten plastic for melting to extrude a plastic material for forming a pellet at an upper portion thereof.

The extruding means 10 is inscribed with a groove 14 in a spiral shape at a lower end face of a rotating member (circular disk screw) 12 in a circular pillar shape rotated in a horizontal direction from a center thereof to a periphery thereof. Further, there is constituted a structure in which in accordance with rotating the rotating member 12 by an electric motor attached with a speed reducing gear (geared motor) 16, a plastic material 20 for forming a pellet fed from a hopper 18 provided on an outer side of the rotating member 12 to a surrounding of the lower end face of the rotating member 12 is continued to be pressurized to the center of the lower end face of the rotating member 12 along an inner side of the groove 14 in the spiral shape of the lower end face of the rotating member 12 while being gradually continued to be heated and melted by an electric heater 30 by way of a heating cylinder 32 and the rotating member 12. There is constituted a structure in which the molten plastic pressurized to the center of the lower end face of the rotating member 12 is continuously and successively extruded from an extrusion port 19 provided at the center of the lower end face of the rotating member 12 to a downward side of the rotating member 12.

The extruding means 10 is constituted by a vertical structure inscribed with the groove 14 in the spiral shape at the lower end face of the rotating member 12 in the circular pillar shape, which is preferable for narrowing an area of installing the plastic pellet forming apparatus. The extruding means 10 is used also in an injection molding apparatus described in Japanese Patent Publication No. 3418639.

A downward side of the rotating member 12 is arranged with a die 40 in a shape of a circular disk in a state in which an upper end face thereof is substantially brought into contact with the lower end face of the rotating member 12 with a small clearance therebetween such that rotation of the rotating member 12 is not hampered. Further, there is constituted a structure in which the molten plastic continued to be extruded from the extrusion port 19 at the center of the lower end face of the rotating member is continuously and successively pressed into a strand forming path 44 provided at the die by passing an introducing port 42 to continuously form a strand 50. There is constructed a structure in which the strand 50 continuously formed by being pressed into the strand forming path 44 is continuously pressed from a strand forming path lower end 46 provided at a lower end face of the die 40 in a vertical lower direction in correspondence with a direction of operating a gravitational force.

A cylindrical guide 60 which is not provided with an opening portion of a hole or the like at a side wall thereof constituting strand cooling means 100 is arranged right below the strand forming path lower end 46 of the die in a state of being erected vertically. Further, there is constituted a structure in which the strand 50 continued to be extruded from the strand forming path lower end 46 of the die and in the molten state is introduced from an upper end opening portion 62 of the cylindrical guide, passed through an inner side of the cylindrical guide 60 and is continuously discharged from a lower end opening portion 64 of the cylindrical guide to a lower side of the cylindrical guide 60.

An upper end and a lower end of the cylindrical guide 60 are fixed to and supported by an apparatus frame 70. An insulating plate 80 is interposed between the apparatus frame 70 and the die 40. Further, heat of the electric heater 30 is prevented from being transferred to the cylindrical guide 60 by way of the apparatus frame 70.

Figure 2:
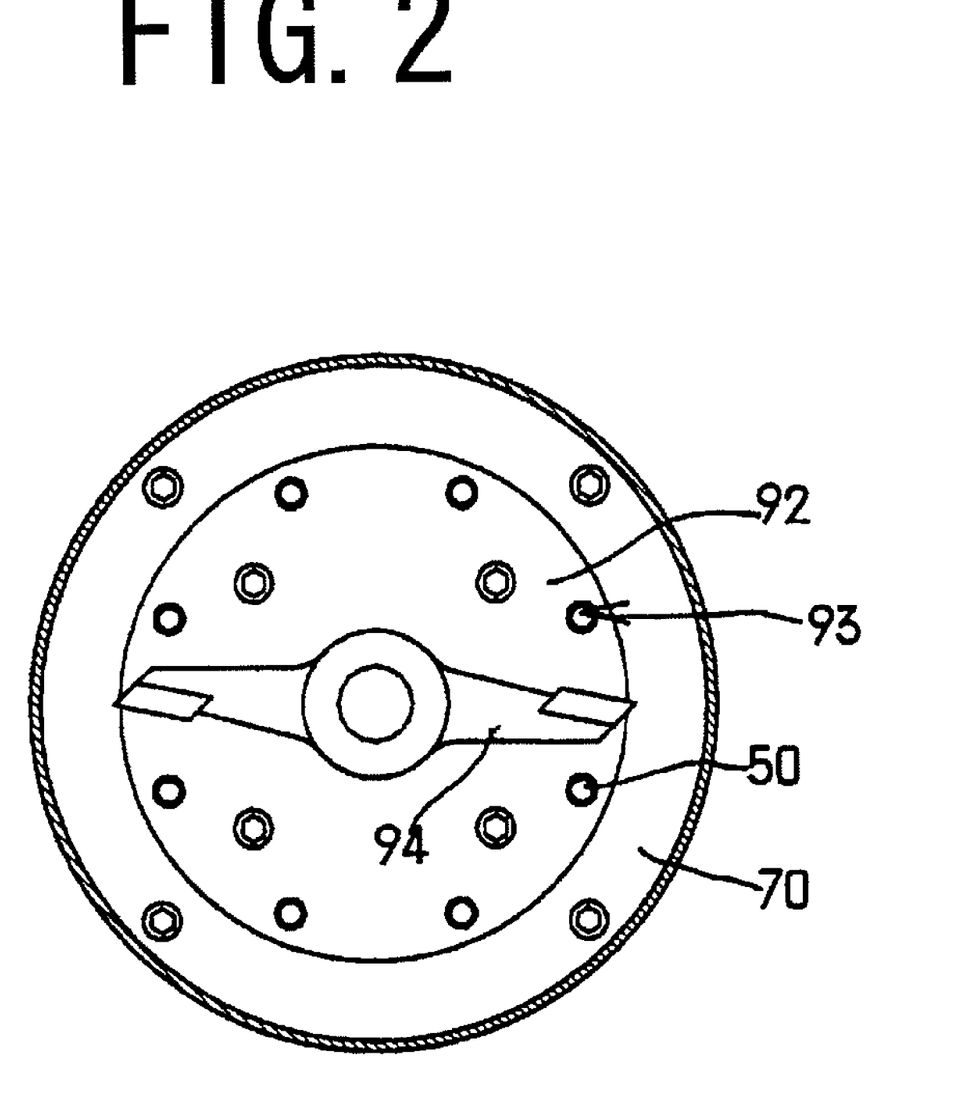
FIG. 2 is a bottom view of a portion including a cutter of the plastic pellet forming apparatus of the invention.

A lower end of the cylindrical guide 60 is provided with a cutter 90 for cutting the strand, which is a cutter 90 for successively and uniformly cutting the strand 50 continuously discharged from the lower end opening portion 64 of the cylindrical guide to the lower side of the cylindrical guide 60 by a constant length. As shown by FIG. 1 and FIG. 2, the cutter 90 is constituted by a structure of combining a fixed blade 92 and a rotating blade 94. The fixed blade 92 is substantially constituted by a circular disk shape and is fixed to the lower end of the cylindrical guide 60. The rotating blade 94 is substantially constituted by a rod-like shape, is fixed on a central rotation shaft of the rotating blade 94 rotated by a variable speed electric motor 96 provided on an inner side of the apparatus frame 70 and is rotated along a lower end face of the fixed blade 92 substantially constituted by the circular disk shape. Further, there is constituted a structure in which the strand 50 continuously discharged to the lower side of the fixed blade 92 by passing a hole 93 provided at the fixed blade continuous to the lower end opening portion 64 of the cylindrical guide is successively cut uniformly by a constant length by the rotating blade 94 rotated along the lower end face of the fixed blade 92.

At that occasion, there is constituted a structure in which a rotational speed of the rotating blade 94 rotated along the lower end face of the rotating blade 94 can be adjusted to a retarded speed in accordance with a speed of discharging a strand 50 discharged to a lower side of the fixed blade 92 by passing the hole 93 by adjusting a rotational speed of the variable speed electric motor 96. Further, there is constituted a structure in which a length of the pellet cut to be formed from the strand 50 by the cutter 90 comprising the fixed blade 92 and the rotating blade 94 can be adjusted to a desired constant length.

According to the pellet forming apparatus shown in FIG. 1 and FIG. 2, as a characteristic point thereof, there is constituted a structure in which the cooling means 100 of the strand feeds a refrigerant for air cooling from the upper end opening portion 62 of the cylindrical guide to the inner side of the cylindrical guide 60 so as not to be escaped into outside air, circulated at surrounding of the strand 50 while being brought into contact with the strand 50 passing through the inner side of the cylindrical guide 60 while being prevented from being leaked to outside of the cylindrical guide 60, thereafter, discharged from the lower end opening portion 64 of the cylindrical guide to outside of the cylindrical guide 60.

Specifically, as shown by FIG. 1, an apparatus frame upper end (cylindrical pipe holding plate) 72 for supporting an upper end of the cylindrical guide 60 is provided with a refrigerant path 76 for feeding the refrigerant for air cooling from the upper end opening portion 62 of the cylindrical guide to the inner side of the cylindrical guide 60 so as not to be escaped into outside air by passing a refrigerant introducing port 74 provided at a lower face of a center thereof to provide an airtightness with the apparatus frame 70 and outside of the cylindrical guide 60.

As shown by FIG. 1, the refrigerant introducing port 74 provided at the apparatus frame upper end 72 is connected with refrigerant feeding means 110 for continuously feeding the refrigerant for air cooling (air) to the refrigerant path 76 provided at the apparatus frame upper end 72.

The refrigerant feeding means 110 is constituted by a blowing fan (not illustrated) and a refrigerant introducing path 112 for feeding the air refrigerant fed from the fan to the refrigerant introducing port 74. Further, there is constituted a structure in which air (refrigerant) for cooling is continuously fed to the upper end opening portion 62 of the cylindrical guide by passing the refrigerant introducing path 112 and the refrigerant path 76 so as not to be escaped into outside air.

According to the cylindrical guide 60, a total of a peripheral wall thereof excluding the upper end opening portion 62 and the lower end opening portion 64 is constituted by an airtight structure which is not provided with an opening portion of a hole or the like.

According to the pellet forming apparatus, the rotating member 12 can be continued to heat to the desired temperature by the electric heater 30 while rotating the rotating member 12 by the speed reduction gear attached electric motor 16. Further, the plastic material of a crushed plastic scrap, a virgin material or the like carried into the hopper 18 provided on the outer side of the rotating member 12 can be continued to pressurize on the inner side of the groove 14 in the spiral shape at the lower end face of the rotating member from the surrounding of the lower end face of the rotating member 12 to the center. Along therewith, the plastic material 20 continuing to pressurize on the inner side of the groove 14 in the spiral shape of the lower end face of the rotating member to the center of the lower end face of the rotating member 12 can gradually be continued to heat and melt by way of the heating cylinder 32 and the rotating member 12. Further, the molten plastic in a state of melting the plastic material 20 can continuously and successively be extruded from the extrusion port 19 provided at the center of the lower end face of the rotating member 12 to the downward side of the rotating member 12.

The molten plastic continuously pressed out to the downward side of the rotating member 12 can continuously be formed into the strand 50 by being continuously and successively pressed into the strand forming path 44 by passing the introducing port 42 provided at the center of the die. The strand 50 continuously formed by being pressed to the strand forming path 44 can continuously be pressed out vertically to the lower side of the die 40 in correspondence with the direction of operating the gravitational force from the strand forming path lower end 46 of the lower end face of the die.

The strand 50 brought into the uncooled molten state continuously pressed out from the strand forming path lower end 46 of the die can pass the inner side of the cylindrical guide 60 by being introduced to the cylindrical guide 60 arranged right below the strand forming path lower end 46 from the upper end opening portion 62.

At that occasion, the strand 50 is discharged to the lower side in the vertical direction in correspondence with the direction of operating the gravitational force of the strand forming path lower end 46, and therefore, the strand 50 having the adhering force can smoothly be introduced to the inner wall of the cylindrical guide 60 without being adhered thereto from the upper end opening portion 62 substantially at the center on the inner side of the cylindrical guide 60 arranged to be erected vertically right below the strand forming path lower end 46.

The strand 50 passing through the inner side of the cylindrical guide 60 can continuously be discharged to the lower side of the cylindrical guide 60 from the lower end opening portion 64 of the cylindrical guide.

When the strand 50 extruded from the die 40 and brought into the molten state is passed through the inner side of the cylindrical guide 60, all of the refrigerant (air) for air cooling can be blown to the inner side of the cylindrical guide 60 from the upper end opening portion 62 of the cylindrical guide by passing the refrigerant path 76 having the airtightness provided at the apparatus frame upper end 72 without being escaped into outside air. Further, substantially all of the refrigerant for air cooling can be circulated at the surrounding of the strand 50 while being firmly brought into contact with the strand 50 passing the inner side of the cylindrical guide 60 which is not provided with an opening portion of a hole or the like to the side wall without being leaked to outside of the cylindrical guide 60. Further, the strand 50 brought into the molten state passing the inner side of the cylindrical guide 60 can be cooled and solidified efficiently and firmly by the refrigerant for air cooling. The cooled and solidified strand 50 can continuously be discharged to the lower side of the cylindrical guide 60 from the lower end opening portion 64 of the cylindrical guide.

At that occasion, the heat of the electric heater 30 can be prevented from being transferred to the cylindrical guide 60 by way of the apparatus frame 70 by an insulating plate 80. Further, the heat of the electric heater 30 can be prevented from reducing the cooling efficiency of the strand 50 passing the inner side of the cylindrical guide 60 by the cooling means 100 of the air cooling type.

The strand 50 continuously discharged to the lower side of the cylindrical guide 60 from the lower end opening portion 64 of the cylindrical guide can successively be cut uniformly to the constant length by the cutter 90 provided at the lower end of the cylindrical guide 60. Further, a number of pellets constituted by uniformly cutting the strand in the solidified state to the constant length can successively be formed.

According to the pellet forming apparatus, as shown by FIG. 1, it is preferable that the die 40 is provided with a plurality of the branched strand forming paths 44 for feeding the molten plastic extruded by the extruding means 10 to branch to the plurality of strand forming paths 44 and extruding the strand 50 to the vertical lower side respectively from the plurality of strand forming path lower ends 46 continuous to the plurality of strand forming paths 44.

Along therewith, as shown by FIG. 1, it is preferable that the cylindrical guide 60 is constituted by a plurality of the cylindrical guides 60 respectively vertically erected right below the strand forming path lower ends 46 of the plurality of strand forming paths provided at the die 40. Further, it is preferable that the plurality of cylindrical guides 60 introduce the plurality of pieces of the strands 50 respectively extruded from the plurality of strand forming path lower ends 46 vertically to the lower side are introduced from the upper end opening portions 62 of the cylindrical guides right therebelow, passed on the inner sides of the cylindrical guides 60 and extruded to the lower side of the cylindrical guides 60 from the lower end opening portions 64 of the cylindrical guides.

When constituted in this way, the molten plastic extruded from the extruding means 10 can be fed to the plurality of strand forming paths 44 respectively branched to be provided at the die 40. Further, the strands 50 can respectively be extruded simultaneously to the vertical lower sides of the strand forming path lower ends 46 respectively from the plurality of strand forming path lower ends 46 of the lower end face of the die continuous to the plurality of strand forming paths 44. Further, the plurality of pieces of strands 50 for forming the pellets can simultaneously be formed in a short period of time.

Along therewith, the plurality of pieces of strands 50 simultaneously formed in the short period of time in this way can be introduced from the upper end opening portions 62 of the cylindrical guides to the inner sides of the plurality of cylindrical guides 60 respectively erected vertically right below the plurality of strand forming path lower end 46 of the die. Further, the plurality of pieces of strands 50 can respectively be cooled and solidified sufficiently in the short period of time by circulating air for cooling fed from the refrigerant feeding means 110 to surroundings of the strands 50 respectively passing the inner sides of the plurality of cylindrical guides 60. The solidified strands 50 discharged to the lower sides of the cylindrical guides 60 from the lower end opening portions 64 of the cylindrical guides can be formed into pellets by being successively and uniformly to the constant length by the cutter 90. Further, a number of pellets can efficiently and simultaneously be formed in the short period of time.

Further, by forming the molten plastic extruded from the extruding means 10 to branch into the plurality of pieces of strands 50 by the die, and passing the plurality of pieces of strands 50 respectively separately on the inner sides of the cylindrical guides 60, the efficiency of cooling by the air cooling type cooling means the strands 50 brought into the molten state respectively passing the inner sides of the plurality of cylindrical guides 60 can be promoted. Further, the plurality of pieces of cooled and solidified strands 50 for forming pellets can be formed efficiently and simultaneously in the short period of time.

According to the pellet forming apparatus, the refrigerant for air cooling fed to the inner side of the cylindrical guide 60 by the refrigerant feeding means 110 may be cooling air cooled to a minus temperature or the like instead of air in a normal temperature state.

Further, the cooling efficiency by the cooling means 100 of the strand 50 passing the inner side of the cylindrical guide 60 may firmly and considerably be promoted by cooling air constituting the refrigerant for air cooling. Along therewith, the strand 50 passing the inner side of the cylindrical guide 60 may be made to be able to cool and solidify stably and firmly by the cooling means 100 without being influenced by a change in atmospheric temperature.

As the refrigerant feeding means 110 in this case, for example, an ultra low temperature air generator or the like referred to as a Vortex tube for cooling air fed from a compressor to an ultra low temperature state may be used.

According to the plastic pellet forming apparatus, as shown by FIG. 1, there may be constituted a structure in which a throat nozzle 120 a front end inner diameter of which is smaller than an inner diameter of the cylindrical guide 60 for forming the strand is provided at the strand forming path lower end 46 of the die to be communicated with the strand forming path 44. The front end of the throat nozzle 120 may be constituted by a structure of being introduced to the inner side of the upper end opening portion 62 of the cylindrical guide in a state of being hung at a middle in noncontact with an inner wall of the cylindrical guide 60.

Further, the strand 50 extruded from the die 40 and brought into the molten state may be passed through an inner side of the throat nozzle 120 provided at the strand forming path lower end 46 for forming the strand, and an outer diameter of the strand 50 may be narrowed to a small diameter up to an inner diameter of the front end of the throat nozzle 120 smaller than the inner diameter of the cylindrical guide 60. Further, the strand 50 narrowed to the small diameter may be made to be able to introduce smoothly to the inner side of the cylindrical guide 60 the inner side of which is larger than the small diameter without being caught thereby.

Along therewith, the strand 50 extruded from the die 40, having the adhering force and brought into the molten state may be made to be able to introduce smoothly in substantially the center of the inner side of the cylindrical guide 60 and without being adhered to the inner wall of the cylindrical guide 60 from the front end of the throat nozzle 120 introduced to the inner side of the upper end opening portion 62 of the cylindrical guide in the state of being hung at the middle in noncontact with the inner wall of the cylindrical guide 60.

There may be constituted a structure in which the refrigerant for air cooling is fed to the inner side of the cylindrical guide 60 by passing a clearance between the inner wall of the upper end opening portion 62 of the cylindrical guide and the outer wall of the front end of the throat nozzle 120 introduced to the inner side of the opening portion of the upper end of the cylindrical guide in the state of being hung at the middle.

According to the pellet forming apparatus, it is found from a pellet forming experimental result using various plastic materials of different kinds, different colors or the like that it is preferable that the inner diameter of the cylindrical guide 60 is 1.5 through 3.0 times as much as the inner diameter of the front end of the throat nozzle 120, preferably, 2.0 times as much as the inner diameter.

Figure 3:
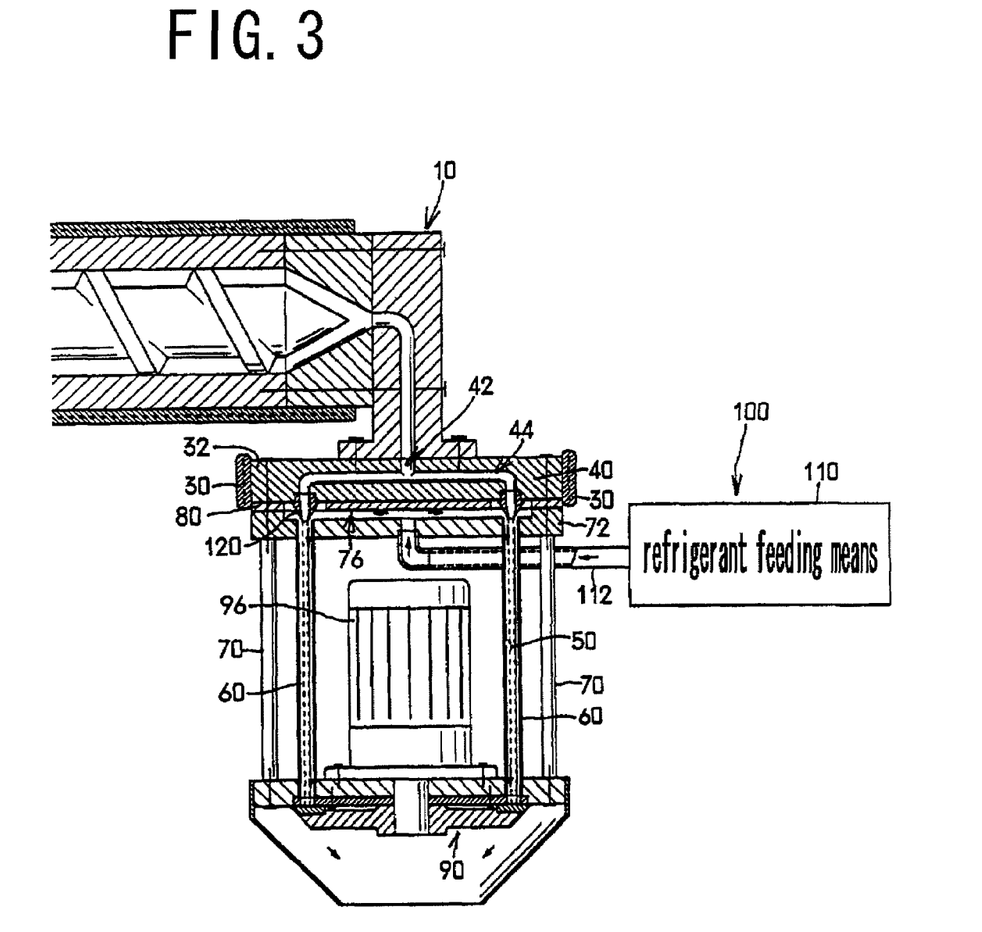
FIG. 3 is a front sectional view of other plastic pellet forming apparatus of the invention.

According to the pellet forming apparatus, as shown by FIG. 3, the above-described hot rotation screw can also be used for the extruding means 10 of the molten plastic.

The invention claimed is:

1. A plastic pellet forming apparatus comprising:
means for extruding of a molten plastic for melting and extruding a plastic material for forming a pellet;
a die for introducing the molten plastic extruded from the means for extruding to a strand forming path, forming a strand, and extruding the strand from a lower end of the strand forming path in a vertical lower direction;
a cylindrical guide assembly providing means for cooling of the strand as the strand is vertically extruded below the lower end of the strand forming path of the die for introducing the strand extruded from the die from an upper end opening portion of a cylindrical guide, passing the strand through an inner side of the cylindrical guide member, thereafter, and discharging the strand from a lower end opening portion of the cylindrical guide; and
a cutter for cutting the strand discharged from the lower end opening portion of the cylindrical guide successively at a uniformly constant length,
wherein the means for cooling of the strand includes a source of a refrigerant for air cooling from the upper end opening portion of the cylindrical guide through an inner side of the cylindrical guide without permitting an escaping of the refrigerant into outside air, by circulating the refrigerant to surrounding the strand passing through the inner side of the cylindrical guide and discharging the refrigerant from the lower end opening portion of the cylindrical guide to a position outside of the cylindrical guide.

2. The plastic pellet forming apparatus according to claim 1, wherein the die branches the molten plastic extruded from the means for extruding to introduce into a plurality of strand forming paths and respectively extrudes the strands in the vertical lower direction from the lower ends of the plurality of strand forming paths; and
wherein the cylindrical guide assembly is constituted by a plurality of cylindrical guides respectively erected vertically right below the lower ends of the plurality of strand forming paths which are the plurality of cylindrical guides for introducing the strands extruded from the lower ends of the strand forming paths in the vertical lower direction from the upper end opening portions, passing the strands through the inner sides of the cylindrical guides and discharging the strands from the lower end opening portions to positions outside of the cylindrical guides.

3. The plastic pellet forming apparatus according to claim 1, wherein the refrigerant for air cooling is cooling air.

4. The plastic pellet forming apparatus according to claim 1, wherein the refrigerant for air cooling is air at an ambient temperature.

5. The plastic pellet forming apparatus according to claim 1, wherein the lower end of the strand forming path of the die is provided with a throat nozzle for forming the strand by a front end inner diameter which is smaller than an inner diameter of the cylindrical guide to be communicated with the strand forming path, and a front end of the throat nozzle is introduced to an inner side of the upper end opening portion of the cylindrical guide in a state of being suspended at a transverse middle thereof in noncontact with an inner wall of the cylindrical guide.

6. The plastic pellet forming apparatus according to claim 5, wherein the inner diameter of the cylindrical guide is 1.5 through 3.0 times larger than the front end inner diameter of the throat nozzle, and preferably, 2.0 times as much as the inner diameter of the front end of the throat nozzle.

7. A plastic pellet forming apparatus for conversion of plastic scrap into recycled plastic pellets for use in a plastic injection molding operation comprising:
an extruding member with a spiral shape groove;
a plastic feeder for delivering solid plastic scrap to the spiral shaped groove for translation to an extrusion port;
a heater for providing a sufficient amount of heat to the extruding member to convert the solid plastic scrap to a molten slate as the plastic scrap translates along the spiral shaped groove;
a die for receiving the molten plastic and transferring the molten plastic into a plurality of elongated plastic extrusions extending away from the die;
a plurality of guides operatively positioned to receive the respective elongated plastic extrusions at a position surrounded by the respective guides;
a source of a cooling fluid connected to the respective guides to surround and cool the elongated plastic extrusions to a solid when the solid plastic extrusion exits the respective guide; and
a cutter unit to cut each solid plastic extrusion to a predetermined length as a plastic pellet adjacent the respective guides.

8. The plastic pellet forming apparatus of claim 7 wherein the die extrudes each of the plurality of elongated plastic extrusions in a cylindrical form that is between 1.5 to 3 times smaller than an inner diameter of the guides.

9. The plastic pellet forming apparatus of claim 7 wherein the extruding member is a rotable member with a flat surface supporting the spiral shaped groove.

10. The plastic pellet forming apparatus of claim 7 wherein the cutter unit includes a rotating rod blade with a blade at each end.

11. In a plastic pellet forming apparatus for conversion of molten plastic into plastic pellets for use in a plastic injection molding operation, the improvement comprising:

a die for receiving the molten plastic and transferring the molten plastic into a plurality of elongated plastic extrusions extending vertically downward by gravity from the die;

a plurality of guides operatively positioned to receive each respective elongated plastic extrusions at positions surrounded by the respective guides; further including a cutter unit to cut each solid plastic extrusion to a predetermined length as a plastic pellet adjacent the respective guides; and a source of a cooling air connected to the respective guides to surround and space the elongated plastic extrusions from contact with the guides as the air cools each of the elongated plastic extrusions to a solid so that a solid plastic extrusion exits each of the respective guides.

12. The plastic pellet forming apparatus of claim 11 wherein the cutter unit includes a rotating rod blade with a blade at each end.

13. The plastic pellet forming apparatus of claim 12 further including a fixed blade attached to the end of each of the plurality of guides with apertures adjacent exit of the respective guides, wherein the apertures and the rotating rod blades provide a scissor cutting effect.

\* \* \* \* \*